United States Patent [19]

Rust et al.

[11] Patent Number: 5,517,601
[45] Date of Patent: May 14, 1996

[54] HIGH SPEED APPARATUS AND METHOD FOR RASTERIZATION OF FONT GLYPHS

[75] Inventors: Robert Rust; Eugene A. Roylance, both of Boise, Id.

[73] Assignee: Hewlett-Packard Company, Palo Alto, Calif.

[21] Appl. No.: 316,162

[22] Filed: Sep. 30, 1994

[51] Int. Cl.⁶ .................................................. G06K 7/10
[52] U.S. Cl. .......................................... 395/110; 395/150
[58] Field of Search .................................. 395/115, 400, 395/600, 800, 101, 110, 141, 133, 150; 364/518

[56] References Cited

U.S. PATENT DOCUMENTS

| | | | |
|---|---|---|---|
| 4,928,247 | 5/1990 | Doyle et al. | 364/518 |
| 5,097,411 | 3/1992 | Doyle et al. | 395/600 |
| 5,155,822 | 10/1992 | Doyle et al. | 395/400 |
| 5,159,668 | 10/1992 | Kaasila | 395/151 |
| 5,168,147 | 12/1992 | Bloomberg | 235/456 |
| 5,195,176 | 3/1993 | Lung | 395/115 |
| 5,251,322 | 10/1993 | Doyle et al. | 395/800 |
| 5,301,267 | 4/1994 | Hassett et al. | 395/150 |
| 5,307,451 | 4/1994 | Clark | 395/133 |
| 5,315,696 | 5/1994 | Case et al. | 395/133 |
| 5,321,810 | 6/1994 | Case et al. | 395/166 |
| 5,325,479 | 6/1994 | Kaasila | 395/151 |

FOREIGN PATENT DOCUMENTS

| | | | |
|---|---|---|---|
| 0406956 | 1/1991 | European Pat. Off. | G06K 15/02 |
| 9107843 | 5/1991 | WIPO | H04N 1/21 |

Primary Examiner—Raymond J. Bayerl
Assistant Examiner—Steven P. Sax

[57] ABSTRACT

An apparatus derives data to enable a fill action during operation of a print device along a scan line. The apparatus includes a processor which determines, for each of a sequence of contours of a glyph, point of intersection values between a scan line and the contours. The sequential point of intersection values indicate OFF-to-ON and ON-to-OFF transitions required of the print device. Sequential OFF-to-ON and ON-to-OFF transitions comprise a transition pair. The apparatus includes a memory comprising 2N storage positions for storage of N transition pairs. Comparator circuitry is coupled in parallel to the 2N storage positions. A controller operates the comparator circuitry to determine an order of all OFF-to-ON point of intersection values and an order of all ON-to-OFF point of intersection values in the 2N storage positions. Switch circuitry is responsive to the determined order of OFF-to-ON point of intersection values to re-order the OFF-to-ON point of intersection values in the 2N storage positions and is further responsive to the determined order of the ON-to-OFF point of intersection values to re-order the ON-to-OFF point intersection values in the 2N storage positions. Overlap regions are determined and transition pairs to be arranged so that overlap regions are ignored.

8 Claims, 3 Drawing Sheets

| | ON/OFF | TRANSITION | LINK | COUNT | HALF | ON #1 | OFF #1 | ON #2 | OFF #2 | ON #3 | OFF #3 |
|---|---|---|---|---|---|---|---|---|---|---|---|
| 1 | ON | A | 0 | 0 | 0 | A | – | – | – | – | – |
| 2 | OFF | B | 0 | 1 | 0 | A | B | – | – | – | – |
| 3 | ON | C | 0 | 1 | 1 | A | B | C | – | – | – |
| 4 | OFF | D | 0 | 2 | 0 | A | D | C | B | – | – |
| 5 | ON | E | 0 | 2 | 1 | A | D | C | B | E | – |
| 6 | OFF | F | 0 | 3 | 0 | A | D | C | F | F | B |

HIGH SPEED APPARATUS AND METHOD FOR RASTERIZATION OF FONT GLYPHS

FIELD OF THE INVENTION

This invention relates to a method and apparatus for determining where fill areas exist in a rasterized pixel representation of a glyph and, more particularly, to an improved method for sorting pixel value transitions at contours of a glyph to enable a rapid determination of raster fill areas.

BACKGROUND OF THE INVENTION

Glyphs which comprise a font are stored in a font memory as outline data. Such outline data is stored in the form of mathematical functions which describe the curves and straight lines which comprise the glyph. In rasterizing such font data, decisions must be made as to what portions of a glyph outline will be "filled" and which portions will remain un-filled or "white".

Many fonts are rasterized employing a "non-zero winding method". That method achieves rasterization by starting at an outside margin of the image and following a raster scan line through its points of intersection with contours of the glyph. Hereafter, the description will assume that an image is traversed left-to-right, however it is to be understood that image traversal can occur in the opposite direction. It will be further assumed that when a glyph contour is traced, the "ink" is to the right of the contour being traced. If a contour at a point of intersection exhibits a positive (i.e., upward) slope, the point of intersection is assigned a value of plus 1. If, the contour at the point of intersection exhibits a negative (i.e., downward) slope, the point of intersection is assigned a value of minus 1. A running total of the assigned values is maintained and when the sum is non-zero, it is known that pixel locations to the right of the point of intersection where the sum becomes non-zero should be "filled". In other words, at that point of intersection and until a next point of intersection where the running total becomes zero, all pixel locations are printed with a black or other color fill ink.

Each intersection of a raster scan line and a contour is called a transition point and may be either an OFF-to-ON transition or an ON-to-OFF transition, with an OFF-to-ON transition marking the location where a fill action begins. An ON-to-OFF transition marks the location where the fill action stops. In a binary printer, a fill action is manifest by black pixels and the non-fill area is manifest by white pixels (and sometimes vice-versa).

A presently used method for determining the location of fill area pixels is based upon determined "transition pairs". An ON/OFF transition pair is created by taking a leftmost OFF-to-ON transition coordinate and a leftmost ON-to-OFF transition coordinate and pairing them together (assuming a left-to-right scan). A next ON/OFF transition pair is created by taking a next leftmost OFF-to-ON transition coordinate and a next leftmost ON-to-OFF transition coordinate and pairing them. This process is repeated until all transitions are paired.

The process is time consuming and requires a sorting by X coordinates value of both the ON and OFF transitions into two separate lists for each scan line. Then a first OFF/ON transition pair from the OFF/ON transition pair list is paired with a first ON/OFF transition pair from the ON/OFF transition pair list. Overlaps are then determined and the resulting transition pair list is employed to control the print action so as to create appropriate fill areas.

In implementing the above-noted procedure, the prior art has sorted and stored all OFF-to-ON and ON-to-OFF transition coordinates into sequential transition lists until all glyph contours have been traversed. The sorting action is then performed using an insertion sort which requires a sequential comparison of a new X coordinate with coordinates already sorted. The sorting action presents a substantial processing burden to the rasterization function. Further, the prior art either allocates large amounts of memory to the rasterization function (assuming a worst case memory requirement) to hold the transition lists or calculates and constructs linked lists at the expense of substantial computation time.

Accordingly, it is an object of this invention to provide an improved method for determining fill areas in a rasterized glyph representation.

It is another object of this invention to provide an improved method for identifying and sorting transition pairs in a raster representation of a glyph.

It is yet another object of this invention to provide an improved method for determining transition pairs which, as compared to the prior art, reduces the required amount of allocated memory.

SUMMARY OF THE INVENTION

An apparatus derives data to enable a fill action during operation of a print device along a scan line. The apparatus includes a processor which determines, for each of a sequence of contours of a glyph, point of intersection values between a scan line and the contours. The sequential point of intersection values indicate OFF-to-ON and ON-to-OFF transitions required of the print device. Sequential OFF-to-ON and ON-to-OFF transitions comprise a transition pair. The apparatus includes a memory comprising 2N storage positions for storage of N transition pairs. Comparator circuitry is coupled in parallel to the 2N storage positions. A controller operates the comparator circuitry to determine an order of all OFF-to-ON point of intersection values and an order of all ON-to-OFF point of intersection values in the 2N storage positions. Switch circuitry is responsive to the determined order of OFF-to-ON point of intersection values to re-order the OFF-to-ON point of intersection values in the 2N storage positions and is further responsive to the determined order of the ON-to-OFF point of intersection values to re-order the ON-to-OFF point intersection values in the 2N storage positions. Overlap regions are determined and transition pairs to be arranged so that overlap regions are ignored.

DETAILED DESCRIPTION OF THE INVENTION

Figure 1:
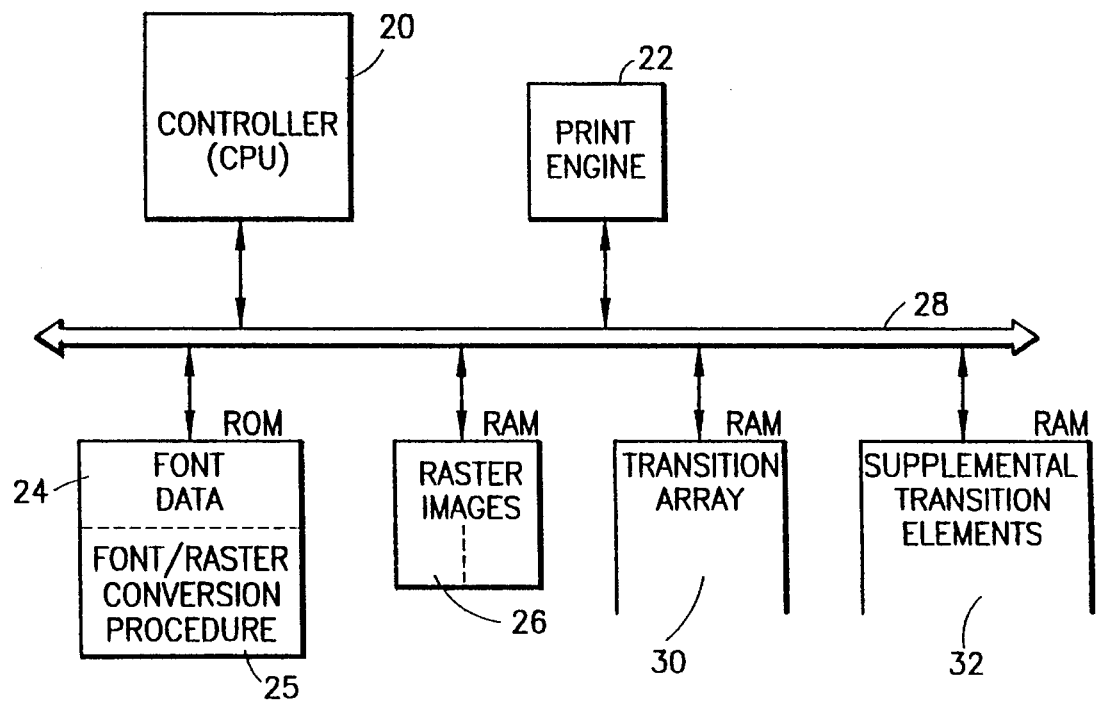
FIG. 1 is a high level block diagram of a print apparatus adapted to perform the invention.

In FIG. 1, a high level block diagram of a printer includes a controller 20, a print engine 22, a read only memory (ROM) 24 and a random access memory (RAM) 26. ROM 24 contains (i) font data to be utilized by the printer to output pages of print data received from a host processor and (ii) a procedure 25 for converting the font data to a raster presentation of each glyph image. RAM 26 includes memory space for storing the raster glyph images. A bus 28 connects the various modules of the printer and enables data and control communications therebetween. To enable implementation of a non-zero winding method, a transition element array 30 and a supplemental transition element array 32 are provided, both connected to bus 28.

Figure 2:
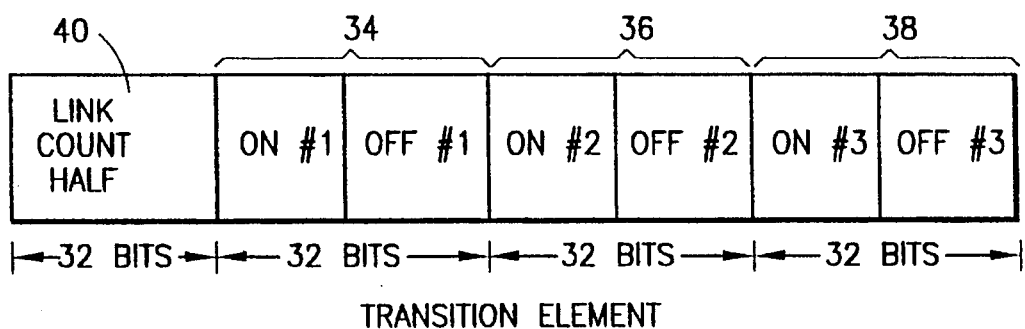
FIG. 2 is a schematic representation of a "transition element" that stores transition pairs for a raster scan line.

In FIG. 2, a block diagram is shown of a "transition element". There is at least one transition element for each scan line that intersects a glyph. All transition elements for a glyph comprise a transition element array. Each transition element includes, for example; four storage areas 34, 36, 38 and 40. Storage areas 34, 36, and 38 are each, for example, 32 bits long, and each storage area stores X coordinate values for an OFF-to-ON pixel transition and an ON-to-OFF pixel transition (of a transition pair). Thus, storage area 34 will include a 16 bit value which stores the X coordinate value of an OFF-to-ON transition and a further 16-bit value which stores the X coordinate value of a paired ON-to-OFF transition. The Y coordinate value is used as an index into the transition element array to select the X coordinate values of transitions for a given scan line.

Three transition pair storage areas are shown in the transition element of FIG. 2 because substantially all Latin glyphs exhibit no more than three transition pairs per row. This is also the case for certain Asian font glyphs. However, many Asian glyphs require additional transition pairs to fully describe intersection points between a scan line and character contours. The transition element of FIG. 2 includes an additional 32-bit portion 40 which contains a number of data values, one of which is used to "link" the transition element to an additional transition element that stores additional transition pairs. The first data value in portion 40 is a link indication which denotes whether another transition element is required to fully define the transition pairs in a glyph. If so, link portion area 40 also contains an address in RAM of the location of the additional transition element. A "count" value is also contained in portion 40 and defines whether the first, second or third transition pair is being processed. The count value increments from 1 to 2 to 3 as transition pairs 38, 36 and 34 are selectively processed (and sorted). A "half" count value indicates whether a first half of a transition pair has been processed and if the remaining half awaits processing.

Glyphs need to be traversed in order (i.e., starting at a particular point, i.e., the "start" point and continuing along the contour until returning to a point just before the start point, i.e., the "end" point). This rule allows insertion of OFF to ON and ON to OFF transitions in pairs. If the half count is zero and an OFF to ON transition is inserted, the next transition will be an ON to OFF transition, or vice versa, since contours are closed curves, by definition. The half count indicates when a pair is partially full.

Figure 3:
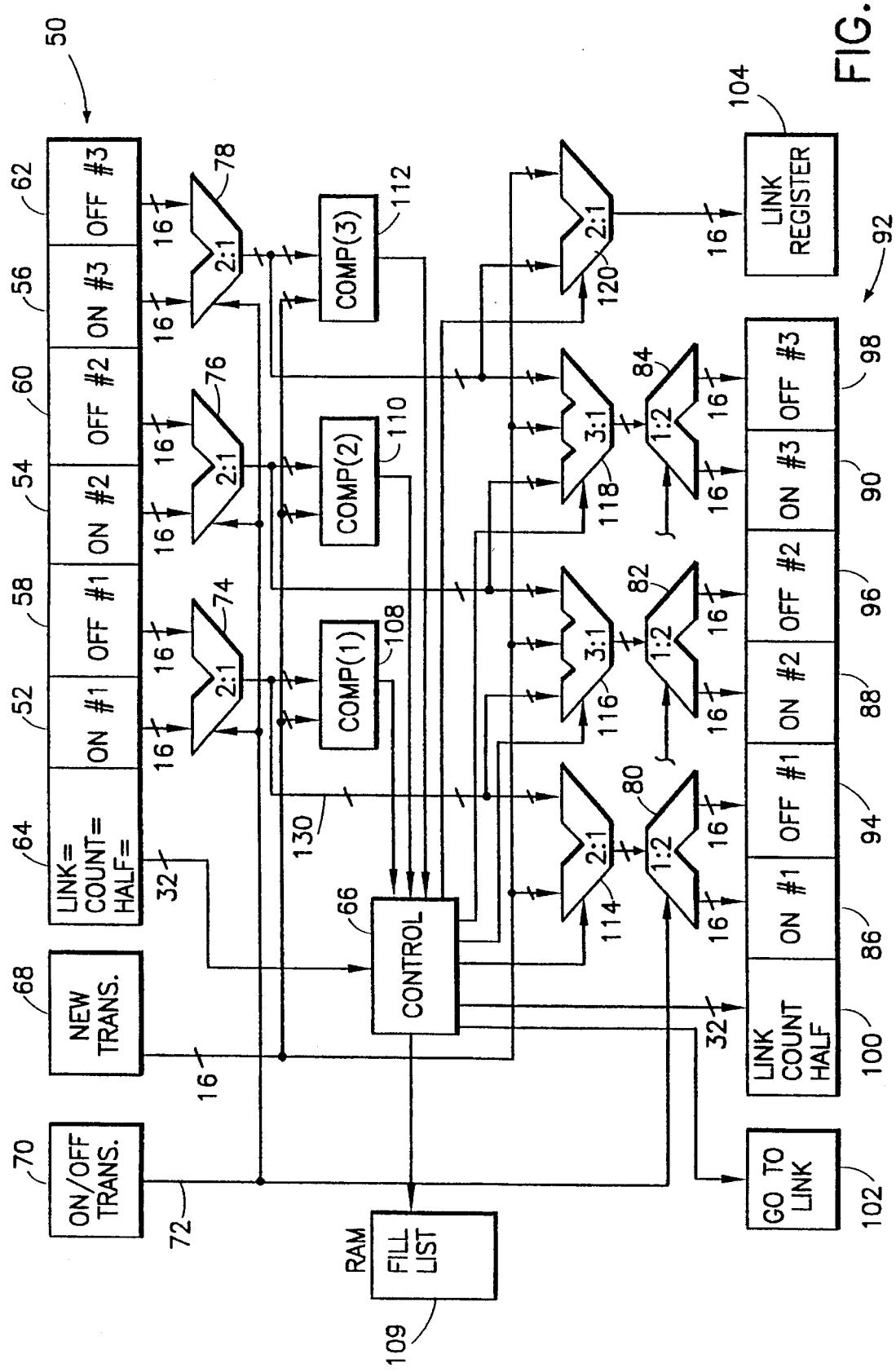
FIG. 3 is a detailed block diagram of a portion of the apparatus shown in FIG. 1.

Turning to FIG. 3, a detailed block diagram is shown of the circuitry required to sort transition pairs by value and to enable a determination of transition pair overlaps. A transition element 50 contains storage positions 52, 54 and 56 for storage of X pixel coordinate values of OFF-to-ON transitions along a scan line (Y coordinate value). In similar fashion, storage positions 58, 60 and 62 are adapted to store X pixel coordinate values of ON-to-OFF transitions along a scan line. Storage positions 52, 58, comprise a first transition pair; storage positions 54, 60, a second transition pair; and storage positions 56, 62, a third transition pair. Storage area 64 includes data which indicates whether the particular scan line requires an additional transition element and the address of the transition element, a "count" value and a "half" value. By a combination of the count and half values, a controller 66 is made aware of which of the transition values is being sorted.

As will be hereafter understood, the invention enables, for each scan line, an identification of XY coordinates of each pixel value transition. Those transitions then need to be sorted to identify all fill areas. The Y coordinate is used to select the transition array elements and each X coordinate value is placed, in sequence, in a "new transition" register 68. An ON/OFF transition latch 70 manifests either an active state or an inactive state, depending upon whether the new transition is an OFF-to-ON transition or an ON-to-OFF transition. The active/inactive state, is emplaced on output line 72 and controls the switching state of a plurality of multiplex switches 74, 76 and 78 which receive as inputs, values from storage positions in transition element 50. Additionally, the active/inactive state on line 72 is further applied to three additional multiplex switches 80, 82 and 84 to control their respective switching states. If an OFF-to-ON transition (as manifest by an active state on line 72) is signalled, each of multiplex switches 74, 76 and 78 is enabled to pass the X coordinate values stored in each of the OFF-to-ON storage positions 52, 54, and 56. Similarly, if the state on line 72 is inactive, multiplex switches 74, 76 and 78 pass the ON-to-OFF X coordinate values in storage positions 58, 60 and 62, respectively. An active state on line 72 will cause each of multiplex switches 80, 82 and 84 to direct a transition coordinate value to an OFF-to-ON storage position 86, 88 and 90 in transition element 92. If the state on line 72 is inactive, each of multiplex switches 80, 82 and 84 will direct a transition coordinate value into ON-to-OFF storage positions 94, 96, and 98.

Transition element 92 further contains a storage portion 100 which contains link, count and half values. Those values are updated in accordance with the processing state of the circuit. It is to be understood, that transition element 92 may be either a separate transition element or may be transition element 50 (with the updated values being written over the previously inserted values in each of the storage positions). To simplify the description, transition element 92 will hereafter be referred to as a separate transition element. Transition element 92 will be returned to its proper storage position (index=Y coordinate value) to transition array 30 (FIG. 1).

Associated with transition element 92 is a "go to" link latch 102 which indicates (via sensing an overflow condition) that a particular scan line requires one or more additional "link" transition elements to fully define all of the transition pairs present thereon. The address where a link transition element is stored is found in the link component of element 100 in transition element 92, and in turn, points to a storage position within RAM 32 (see also FIG. 1).

In the case where there are more than three transition pairs on a scan line, the first half of the fourth transition pair will "overflow" during the sort process and end up in link register 104 (via multiplexer 120). That value is passed to new transition register 68. At the same time, "go to" link register 102 is set. If the link value in storage portion 100 is zero when "go to" link register 102 is set, a new transition element must be allocated in supplemental transition elements in RAM 32 (FIG. 1). If the link value in storage portion 100 indicates an address, a supplemental transition element already exists.

If no supplemental transition element exists, the link, count and half values in portion 64 of transition element 50 are initialized to zero and the sort proceeds. If there is an existing supplemental transition element, it is loaded into transition element 50 (the values in transition element 92 are saved). The sort action then continues.

This configuration enables a majority of the transition array to be comprised of transition elements that include only three transition pair storage positions and a link/count/half storage position. If a particular scan line requires an additional transition element due to the presence of more than three transition pairs, the additional transition element is linked by the link address to a position in RAM 32. In such manner, the transition element array is comprised, in the main, of 128 bit transition elements, thereby enabling efficient memory usage (as contrasted to the prior art which assured that all transition elements were sufficiently large to accommodate the largest number of expected transition pairs). If necessary, added memory for additional transition elements can be allocated as the sorting process progresses.

During the building of the transition element array, each transition element in the array is filled with transition pairs, ordered in increasing value, so as to enable a fill action to be properly controlled. The non-zero winding method used to determine intersections between glyph contours and a scan line does not necessarily arrange the intersections in increasing transition pair order. As a result, OFF-to-ON entries and ON-to-OFF entries in each transition element (for each scan line) must be ordered into increasing value.

To accomplish rapidly such a sort action, the circuit shown in FIG. 3 includes comparators 108, 110, and 112 which are respectively connected to the outputs of multiplex switches 74, 76 and 78. An additional input to each of comparators 108, 110, and 112 is the X coordinate value of a new transition point, as fed from new transition register 68. Outputs from each of comparators 108, 110, and 112 indicate which applied X coordinate value is larger. The comparator outputs are fed to a control module 66 which, in response to the comparator input values, feeds switch control signals to multiplex switches 114, 116, 118, and 120. The new transition X coordinate value is fed from new transition register 68 to each of multiplexers 114, 116, 118, and 120, as are the X coordinate values from multiplex switches 74, 76, and 78.

Each of multiplex switches 74, 76 and 78 causes the transmission to comparators 108, 110 and 112 of either all OFF-to-ON X pixel coordinate values found in storage positions 52, 54, and 56 or all of ON-to-OFF pixel coordinate values found in storage positions 58, 60, and 62. The switching state of each of multiplexers 74, 76, and 78 is controlled by the state of ON/OFF transition latch 70. If the new transition X address value in new transition register 68 evidences an OFF-to-ON transition, then the output state from latch 70 causes each of the aforesaid multiplexers to feed the OFF-to-ON pixel transition values to the respectively connected comparators. Similarly ON-to-OFF pixel transition values are output if the new transition is an ON-to-OFF transition.

Each of comparators 108, 110, and 112 compares the X coordinate value in new transition register 68 with the stored OFF-to-ON X coordinate value fed from transition element 50. Depending upon which X value is larger, the respective comparators provide an indication thereof to control module 66. The count value from storage position 64 enables control module 66 to determine which outputs from comparators 108, 110, and 112 to examine during a particular cycle of operation.

Control module 66 upon receiving an output (or outputs) from comparator 108, 112, or 112 (as the case may be), provides control signals to one or more of multiplex switches 114, 116, 118, and 120. Those signals cause one of the inputs fed to a multiplex switch to be switched to the respective output so as to be available for insertion into transition element 92 via multiplexers 80, 82, and 84 (or to link address module 104).

The sort action, causing a replacement of transition value coordinates in transition element 92, occurs in parallel, during two clock cycles, thereby enabling three transition coordinates to be simultaneously sorted. Once all of the sorting has occurred, control module 66 determines whether overlaps are present in the sorted transition pairs and, if so, marks certain of the transition coordinates to be ignored. Then, a fill list is constructed for each of the scan lines and is inserted into RAM area 109 along with similar fill lists for each glyph on a page. At this point, the fill list from RAM portion 109 is employed to control entry of fill data into a raster buffer.

Figures 4, 5:
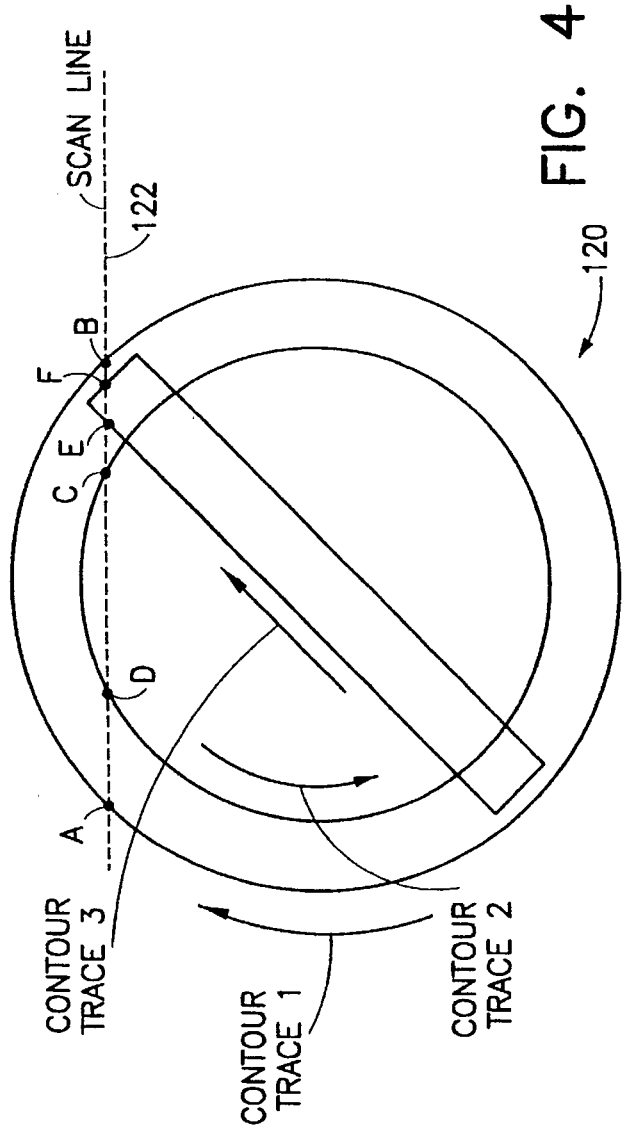
FIG. 4 is a glyph outline indicating points of intersection between a raster scan line and glyph contours.
FIG. 5 is a chart which enables a better understanding of the operation of the block diagram of FIG. 3 when processing glyph contours shown in FIG. 4.

Turning now to FIGS. 4 and 5, an example will be given which illustrates the transition pair sort procedure performed by the circuit of FIG. 3. Glyph 120, as received from font data store 24 (FIG. 1), comprises data describing three contour traces, i.e., contour trace 1, contour trace 2, and contour trace 3. The direction of movement along each contour trace is in accordance with the rule of "ink to the right". The direction of tracing can be also with respect to ink to the left, but all contours must be traced similarly. In the example, the handling of X coordinate values for each of intersection points A–F between scan line 122 and each of contour traces 1, 2, and 3, will be considered.

Assuming that contour trace 1 is the first contour to be considered, the first point of intersection between scan line 122 and contour trace 1 is point A. Because of the slope of contour 1 at point A, it is known that the transition is from OFF-to-ON, thus causing ON/OFF transition latch 70 (FIG. 3) to manifest an active state on line 72. As a result, each of multiplex switches 74, 76, and 78 connect storage positions 52, 54, and 56 to their respective outputs. In addition, the X coordinate value of transition point A are inserted into new transition register 68 where the X coordinate value is provided as an input to comparators 108, 110, and 112, and to each of multiplex switches 114, 116, 118, and 120. Since it is assumed that transition point A is the first transition point to be experienced on scan line 122, there are no entries in each of storage positions 52, 54, and 56.

Currently, the link value in storage position 64 is zero (no link is required); the count value is equal to zero as no complete transition pairs exist in transition element 50; and the half value is also equal to zero as there are no half-filled pairs in transition element 50. Specifically, ON #1 and OFF #1 are empty.

As a result of the aforesaid states, control module 66 ignores the outputs of comparators 108, 110, and 112 and feeds the X coordinate points for transition point A through multiplexers 114 and 80 into ON storage position 86. Each of the values in storage position 100 of transition element 92 are then updated. The link value remains equal to zero, the count value stays at zero (as the first transition pair is being processed), and the half value set to 1 to indicate that it is the OFF transition memory position in the first transition pair that is to be next operated upon (i.e., half a transition pair exists of transition pair #1 ). As shown in line 1 of FIG. 5, the X coordinate values of transition point A resides in ON storage position 86.

The next transition point to be encountered results from a continuation of the tracing of contour trace 1 and is transition point B. It is known that transition point B is an ON-to-OFF transition due to the negative contour slope. As a result, ON/OFF transition register 70 is set to an inactive state and causes each of multiplex switches 74, 76, and 78 to connect to each of OFF storage positions 58, 60, and 62. In a similar fashion, each of multiplexers 80, 82, and 84 connect to OFF storage positions 94, 96, and 98. The current states of the storage positions in transition element 92 are loaded into memory (RAM 30), which is later loaded into transition element 50.

The X coordinate value of transition point B is now loaded to new transition register 68 and is fed as inputs to comparators 108, 110, and 112 and, further, as inputs to each of multiplex switches 114, 116, 118, and 120.

Because there are no values in any of storage positions 58, 60 and 62, control module 66 ignores outputs from each of comparators 108, 110, and 112 and causes the transition point B coordinate values to be fed, via multiplex switches 114 and 80, into OFF storage position 94 in transition element 92 (see row 2 of the chart of FIG. 5). Since both storage positions 86 and 94 now contain the X coordinate values of transition points A and B, the count value is switched to 1 to indicate that it is the second transition pair that is to be considered next. The link and half values are zero.

Since there are no further transition points along contour trace 1 and scan line 122, the next transition point will be C which is found when contour trace 2 is followed. Since the slope at transition point C is positive (in the direction of the trace), ON/OFF transition latch 70 sets output line 72 to the active state and causes each of multiplex switches 74, 76, and 78 to assess ON storage positions 52, 54 and 56. Similarly, multiplex switches 80, 82, and 84 switch their outputs to ON storage positions 86, 88, and 90. The current values in the storage positions of transition element 92 are loaded into memory (RAM 30), and then later loaded into the transition element 50.

The X coordinate of transition point C is now loaded into new transition register 68 and is output to each of comparators 108, 110, and 112. In this instance, since the count value is set equal to 1, control module 66 is caused to examine the output of comparator 108 and finds that the X coordinate value of transition point C exhibits a greater X value than the X coordinate value of transition point A. As a result, control module 66 determines that the X position value of transition point A is smallest and that transition point A remains in ON storage position point 86. As a result, the control signal to multiplex switch 114 causes the X value appearing at the output of multiplex switch 74 to be fed, via lines 130 to multiplex switch 114. There the X coordinate value of transition point A is fed, via multiplex switch 80, into ON storage position 86.

In a similar fashion, control module 66 applies a control potential to three way multiplex switch 116 that causes the X coordinate value of transition point C to be entered (via the center leg of multiplex switch 116 multiplex 82) into ON storage position 88.

As shown in row 3 of FIG. 5, transition points A, B and C are now present in storage positions 86, 94 and 88 of transition element 92. The link value remains equal to zero; the count value remains set to 1 indicating that the second transition pair is still being processed; and the half value is set to 1 indicating that it is now the OFF transition values that are to be considered.

Returning to FIG. 4, the next transition point to be found on contour trace 2 is point D which, because of the negative slope, causes ON/OFF transition latch 70 to be switched to the inactive state. Multiplex switches 74, 76, and 78 are switched to enable inputs from OFF storage positions 58, 60 and 62 to be accessed. Similarly, multiplex switches 80, 82, and 84 are switched to connect their outputs to OFF storage positions 94, 96, and 98. The coordinate values in transition element 92 are eventually loaded into corresponding positions in transition element 50.

The X coordinate value of transition point D is now loaded into new transition register 68 and is fed to comparators 108, 110, and 112. Since the count value is still set to 1, control module 66 examines the output of comparator 108. Inputs to comparator 108 are the X coordinate values of transition point B (from OFF storage position 58) and the X coordinate position of new transition point D. Since the X coordinate value of new transition point D is less than that of transition point B, comparator 108 indicates that relationship to control module 66. In response, control module 66 signals multiplex switch 114 to load the X/Y coordinate values of new transition point D into OFF storage position 94 (in place of the X/Y coordinate points of intersection point B presently stored therein). Three input multiplex switch 16 is also controlled to load the value of the X/Y coordinates of intersection point B (via lines 130, the left most arm of multiplex switch 116 and multiplex switch 82) into OFF storage position 96.

At this point, as shown in row 4 of FIG. 5, storage positions 86, 94, 88, and 96 respectively contain the X coordinate values of transition points A, D, C and B. The link value remains at zero, the count value is updated to two as the third transition pair (storage positions 56 and 62) is to be considered. The half count is set equal to zero indicating that the next transition pair is empty.

Returning to FIG. 4, a trace of contour trace 3 finds OFF-to-ON transition point E and ON-to-OFF transition point F. While transition points E and F both overlap the region to be filled between transition points C and B, the overlap condition is not considered until all of the transition points have been sorted.

The X coordinate value of transition point E is loaded into new transition register 68 and ON/OFF transition latch 70 emplaces an active level on output line 72. The X coordinate value of intersection points A, D, C and B are loaded into storage positions 52, 58, 54, and 60, respectively from RAM 30 (which used to be in transition element 92). The active level on line 72 causes the X coordinate values of transition points A and C to be fed to comparators 108 and 110, respectively. In comparator 108, it is determined that the X coordinate value of transition point E is greater than the X coordinate value of transition point A. In comparator 110, it is found that the X coordinate value of transition point E is greater than the X coordinate value of transition point C. Those determinations cause control module 66 to energize the right hand arms of multiplex switches 114 and 116. The X coordinate value of transition point A is thus entered (via lines 130) into storage position 86 and the X coordinate value of transition point C is entered into storage position 88.

Control module 66 also applies a control potential to multiplexer 118 causing the middle arm thereof to pass the X coordinate values of transition point E into storage position 90. As a result, storage positions 86, 94, 88, 96, and 90 now contain transition points A, D, C, B, and E, respectively. Note that, upon every other cycle, either all OFF-to-ON transitions or all ON-to-OFF transitions are sorted.

A similar operation occurs when transition point F is considered, it being remembered that transition point F is an ON-to-OFF transition, so all ON-to-OFF storage positions are enabled. Prior to the sorting action, the values of A, D, C, B, and E are loaded into transition element 50. The state of transition element 50 is illustrated in row 5 of FIG. 5. Next, the X coordinate value of new transition point F is loaded into new transition register 68. The link value in storage position 64 remains zero, the count value is set to two and the half count is set to one indicating that OFF transitions are being sorted. An inactive state appears on output line 72 from ON/OFF transition latch 70.

Under these circumstances, the X coordinate values of new transition point F and transition point D are compared in comparator 108 where it is determined that the X coordinate value of transition point F is greater. Similarly, the X coordinate value of transition point F is compared with the X coordinate value of transition point B and it is found that the X coordinate value of transition point B is larger. As a result, control module 66 responds to inputs from comparators 108 and 110 by providing control signals to multiplex switches 114, 116 and 118.

It is now known that the X coordinate values for ON-to-OFF transitions indicate increasing values of X coordinates for transitions points D, F and B. Multiplex switches 114, 116 and 118 are thus controlled as follows: multiplex switch 114, via its right hand leg, passes the X coordinate value of transition point D from storage position 58 into storage position 94 (in transition element 92); multiplex switch 116, via its middle leg, passes the X coordinate value of transition point F into storage position 96; and multiplex switch 118, via its left hand leg, passes the X coordinate value of transition point B into storage position 98. The final state of the storage positions in transition element 92 are as indicated in line 6 of the chart of FIG. 5.

While not explicitly considered above, it is to be understood that during updating and sorting of OFF-to-ON values from transition element 50 to transition element 92, that all ON-to-OFF values are maintained unchanged. Similarly, during a sort of ON-to-OFF values, OFF-to-ON values remain unchanged.

From a review of line 6, it can be seen that OFF-to-ON transitions A, C, and E, have been sorted in accordance with increasing X coordinate values. In similar fashion, ON-to-OFF transitions D, F, and B have also been sorted in accordance with increasing values of X coordinates. However, the sort procedure is not yet finished, as an examination of FIG. 4 will show that the ON/OFF transition pair C and F is overlapped by the ON/OFF transition pair E and B.

Throughout the prior description an "ink-to-the-right" font format has been considered. It may occur that a glyph may have "ink-to-the-left". To handle such an occurrence, each previously sorted transition pair may be re-inserted into transition element 50. Each transition pair is compared to assure that its OFF-to-ON X coordinate value is less than its ON-to-OFF X coordinate value. If not, the values are reversed. Using comparators 108, 110 and 111, this action can be accomplished simultaneously for three transition pairs at a time.

To correct for overlaps, each OFF X coordinate value in transition element 92 is compared with an immediately succeeding ON transition X coordinate value by control module 66. If the X coordinate value of the immediately succeeding ON transition is equal to or less than the immediately preceding OFF transition, then it is known that there is an overlap. In such case, both the ON-to-OFF transition of the initial transition pair and the OFF-to-ON transition of the immediately succeeding transition pair are ignored and the fill action proceeds from the ON transition of the initial transition pair to the OFF transition of the succeeding transition pair. In FIG. 4, this procedure enables ON transition E and OFF transition F to both be ignored during the fill operation, thereby allowing the fill to occur between OFF-to-ON transition C through ON-to-OFF transition B.

As a result of the above operation, a fill list is produced in RAM 108 using a minimum of operating cycles to achieve the sort function. When a fill list is present for each glyph, all fill lists are combined to enable a complete raster image to be stored in a raster buffer.

It should be understood that the foregoing description is only illustrative of the invention. For instance, if glyphs are scanned right-to-left, the method is equally applicable, assuming that contour slopes are properly defined in accordance with the direction of tracing thereof. Various alternatives and modifications can be devised by those skilled in the art without departing from the invention. Accordingly, the present invention is intended to embrace all such alternatives, modifications and variances which fall within the scope of the appended claims.

What is claimed is:

1. Apparatus for deriving data to enable ON/OFF control of a print means during a print scan line, said apparatus comprising:

means for determining point of intersection values between a scan line and each of a sequence of contours of a glyph to be printed, each point of intersection defining an OFF-to-ON or an ON-to-OFF transition of a pixel value, sequential OFF-to-ON and ON-to-OFF pixel transitions along a contour comprising a transition pair;

memory means including 2N storage positions for storing N transition pairs;

input means for providing a sequence of point of intersection values of new pixel transitions along said scan line;

comparator means coupled in parallel to said 2N storage positions and said input means;

control means coupled to said comparator means and responsive to each point of intersection value of a new pixel transition to simultaneously order all N like-type pixel transitions from said memory means and said new pixel transition, and to re-position all like type pixel transitions in order in said memory means for control of a later operated fill operation.

2. The apparatus as recited in claim 1, wherein said control means operates said comparator means to determine, simultaneously, an order of OFF-to-ON point of intersection values as between OFF-to-ON point of intersection values stored in said 2N storage positions and an OFF-to-ON point of intersection value of a new pixel transition and to further determine an order of ON-to-OFF point of intersection values stored in said 2N storage positions and an ON-to-OFF point of intersection value of a new pixel transition, said control means further comprising:

first switch means responsive to a determined order of said OFF-to-ON point of intersection values to sort and insert into said memory means, both said OFF-to-ON point of intersection value of said new pixel transition and said OFF-to-ON point of intersection values stored in said 2N storage positions in the order determined, said first switch means further responsive to an order determined of said ON-to-OFF point of intersection values and an ON-to-OFF point of intersection value of a new pixel transition, to sort and insert into said memory means said ON-to-OFF point of intersection values, accordingly.

3. The apparatus as recited in claim 2 wherein after said first switch means has inserted said OFF-to-ON point of intersection values and said ON-to-OFF point of intersection values, said control means determines for each of said stored N transition pairs if an ON-to-OFF point of an intersection value for a first transition pair is equal to or less than an OFF-to-ON point of intersection value for a next transition pair and if yes, enables said print means to fill between an OFF-to-ON point of intersection value of said first transition pair to an ON-to-OFF transition of said next transition pair.

4. The apparatus as recited in claim 1 wherein said value of N is less than a maximum number of transition pairs that may be present in a glyph, said apparatus further comprising:

link memory means for storing point of intersection values of additional transition pairs in excess of N, said link memory means coupled to said comparator means, control means and first switch means to enable a sorting of said additional transition pairs.

5. The apparatus as recited in claim 1 wherein said memory means comprises:

N storage positions for storing N point of intersection values for OFF-to-ON pixel transitions and N storage positions for storing point of intersection values for ON-to-OFF pixel transitions, and further including plural switch means for enabling either values stored in OFF-to-ON transition storage positions or values stored in ON-to-OFF storage positions to be simultaneously fed to said comparator means.

6. The apparatus as recited in claim 5 wherein said comparator means comprises:

a comparator connected to each of said plural switch means so as to enable either a stored point of intersection value for an OFF-to-ON pixel transition or an ON-to-OFF pixel transition to be compared, to a point of intersection value of said new pixel transition received from said input means, each comparator simultaneously providing an input to said control means which indicates an order of inputs applied thereto.

7. The apparatus as recited in claim 6 wherein said control means includes additional switch means that are responsive to control signals, derived by said control means from inputs of each said comparator, to reposition point of intersection values in said memory means in accordance with a determined order.

8. The apparatus as recited in claim 4 where N is equal to 3.

* * * * *